INVENTOR.
GASTON SALMET
BY
Frank R. Trifari
AGENT

INVENTOR.
GASTON SALMET
BY
Frank R. Jeifari
AGENT

March 26, 1968 G. SALMET 3,375,443
RADIO-TRANSMISSION SYSTEM FOR SELECTIVE PULSE COMMUNICATION
BETWEEN STATIONS WHICH SHARE A FREQUENCY BAND
WITH OTHER STATIONS
Filed April 15, 1964 3 Sheets-Sheet 3

INVENTOR
GASTON SALMET
BY
Frank R. Jifani
AGENT

United States Patent Office 3,375,443

Patented Mar. 26, 1968

3,375,443

RADIO-TRANSMISSION SYSTEM FOR SELECTIVE PULSE COMMUNICATION BETWEEN STATIONS WHICH SHARE A FREQUENCY BAND WITH OTHER STATIONS

Gaston Salmet, St. Maur, France, assignor to North American Philips Company, Inc., New York, N.Y., a corporation of Delaware Filed Apr. 15, 1964, Ser. No. 359,858

Claims priority, application France, Apr. 26, 1963, 932,761

8 Claims. (Cl. 325—64)

This invention relates to systems for radio-transmission between a plurality of stations in which the communication between the various stations takes place by modulation of pulses located for the various stations approximately in the same frequency band, and in which during a communication between two stations an address which is characteristic of the relevant station is transmitted simultaneously and permanently together with the transmitted pulses, said address locking the communication between the two stations. It is advantageous to utilize pulse-code modulation, especially delta modulation, in which a series of sequential pulses is transmitted, as is well-known, which characterize the transmitted signal by their presence and absence.

Such transmission systems, which are referred to as "Radas" (Random Acess Discrete Address), are important inter alia for communication between a large number of mobile stations in which a communication between the various stations may be established directly by the co-transmitted address without the intermediary of a central station. Thus, for example, in equipment previously suggested, the transmission of signals was effected by delta modulation and the transmission of the address took place by modulating each of the signal pulses in time sequence on various carrier frequencies. Of all the stations in the radio-transmission system, only the station with the transmitted address is responsive, which is thus characterized by the various carrier frequencies together with the time sequence in which these carrier frequencies occur.

The transmission system referred to requires a considerable band-width due to the multiple modulation of the transmitted pulses, and the transmitted pulse series from two stations having adjacent pulse-recurrence frequencies may coincide for a long period. This gives rise to interference.

It is the object of the invention to provide a radio-transmission system of the kind mentioned in the preamble in which not only a considerable saving in band-width is obtained, but also the freedom of interference is improved.

An arrangement according to the invention is characterized in that at the transmitting end of a station, the transmitted pulses are periodically varied in position in the rhythm of a variation frequency and the incoming pulses in the co-acting receiver are applied to a receiving gate controlled by an AFC-device and which is released by the AFC device in the synchronizing state in the rhythm of the variation frequency. The receiver also includes an address receiver coupled to the AFC device of the receiving gate and which interrupts the synchronization of the AFC device for the receiving gate upon reception of an address which differs for the relevant station.

In order that the invention may be readily carried into effect, it will now be descrbed in detail, by way of example, with reference to the accompanying diagrammatic drawings, in which.

Figure 1:
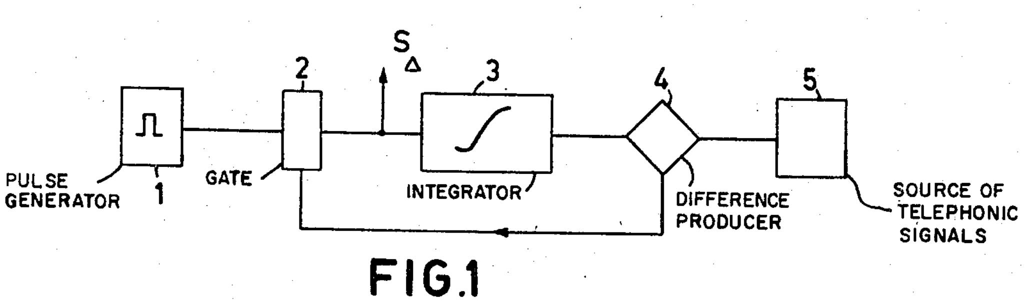
FIGURE 1 shows a delta-modulation transmitting device which may advantageously be used in the transmission system according to the invention.

The delta-modulation transmitting device shown in FIGURE 1 can be used in a station of a transmission system according to the invention. A pulse generator 1 for producing pulses having a recurrence frequency of, say, 30 kc./s. feeds a difference producer 4 by way of a gate 2 and an integrator 3. The difference producer 4 also receives telephonic modulation from device 5. The gate 2 is released or cut off as a function of the polarity of the difference voltage produced by comparison in the difference producer 4, the transmitted pulses which characterize the transmitted signal by their presence or absence being derived from the output $S_\Delta$ of the gate 2. As is known per se, the transmitted signals are recovered in a simple manner at the receiving end by integration of the incoming pulses.

The delta-modulation system shown forms part of a radio-transmission system according to the invention in which communication between two stations can be established without the intermediary of a central station and in which guarantee exists for:

Satisfactory operation in both directions of traffic;

Simple calling of a desired station by means of a characteristic address (somewhat analogous to a telephone number);

The impossibility for a third station of the transmission system either to listen in, or to transmit (in the same band) once the communication between two stations is established.

In addition, a favourable freedom of interference is ensured by preventing the pulse series from two stations transmitting simultaneously from coinciding for a long period and it is especially ensured that the recurrence frequency of the pulses differs slightly from one station to another, these pulses being phase-modulated by a variation frequency of, for example, several hundreds of c./s., more particularly by passing them through a phase variator controlled by an oscillator and having a maximum deviation of about $\pm\pi$ radian.

In the co-acting receiver the incoming pulses are applied to a receiving gate controlled by an AFC device and which is released by the AFC device in the rhythm of a variation frequency. The receiver also includes an address receiver which interrupts the synchronization of the AFC device for the receiving gate upon reception of an address which differs for the relevant station. Thus, the synchronization will be maintained only if the characteristic address is received continuously.

In a first embodiment the address is transmitted in the form of a coded series of pulses having a recurrence frequency which differs from that of the signal pulses and is, for example, 16 times lower and through a special address channel located in an adjacent frequency band.

It is to be noted that the calling station can transmit, in addition to the address of the called station, its own address, for this address is stored by the called station and as soon as the receiver is taken off by the called station it can still receive only the transmission containing both addresses. The calling device of the called station, which is subjected to its synchronizing device, is at the same time released and the calling station itself can only receive the transmission containing both addresses. Operation in both directions of traffic is obtained by transmitting the signal pulses in each station during the time intervals in which the receiver of the relevant station is cut off. Third stations cannot penetrate the conversation as soon as it is established because of their different addresses.

The address, which consists of coded pulses, is synchronized on the signal pulses with a ratio of 1:16.

Figure 2:
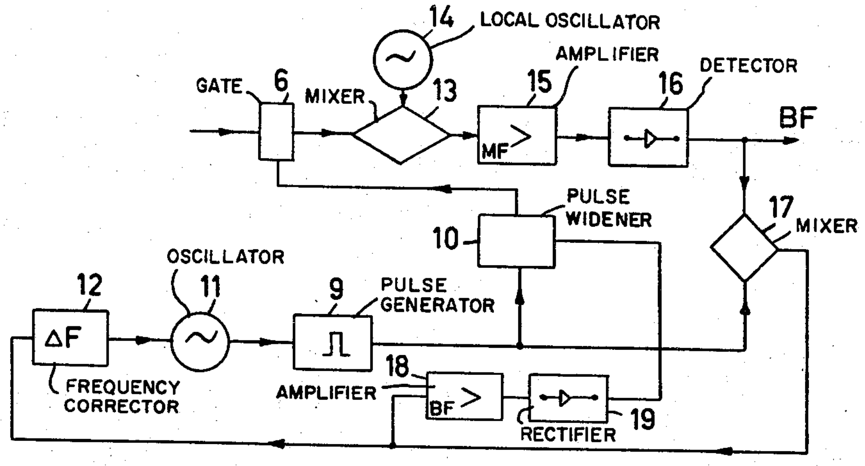
FIGURE 2 shows an AFC device of a receiving gate in a station of the transmission system according to the invention.

FIGURE 2 shows the synchronizing device of the receiving gate in the receiver. A gate 6, to which incoming high frequency signals are applied, is controlled by a pulse generator 9 through a pulse widener 10, the pulse generator 9 being synchronized by an oscillator 11 which is connected to a frequency corrector 12. The pulses derived from the gate 6 are applied through a mixing stage 13 and, connected thereto, a local oscillator 14 and an intermediate-frequency amplifier 15 to an amplitude detector 16 and compared with the pulses from generator 9 in a mixing stage 17 in order to obtain an AFC control voltage which controls the AFC corrector 12. In the synchronized state of the oscillator 11 a control voltage which varies with the phase modulation of the incoming pulses is set up at the output circuit of the mixing stage 17, said control voltage varying through the frequency corrector 12 the gate pulses originating from the gate generator 9 in accordance with the phase modulation of the incoming pulses. The control voltage derived from the output of the mixing stage 17, after being amplified in an amplifier 18 and rectfied in a rectifier 19, is applied as a control voltage to the pulse widener 10 which shortens the pulses derived from the pulse widener when the synchronized state of the oscillator 11 is reached.

Figure 3:
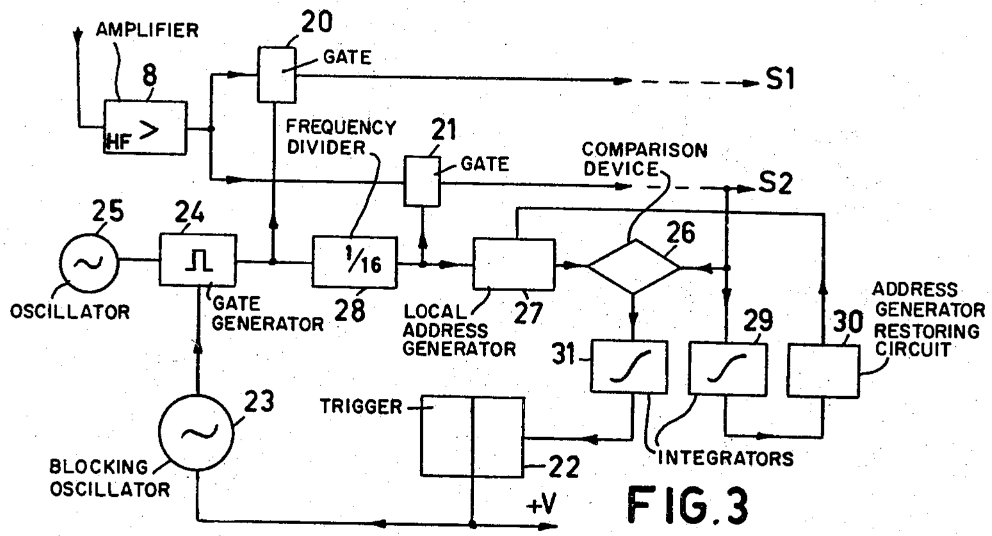
FIGURE 3 shows an address receiver and its co-action with the AFC device for the receiving gate.

FIGURE 3 shows one embodiment of an address receiver in a station of the transmission system according to the invention.

The high-frequency input amplifier 8 supplies two channels $S_1$, $S_2$ provided with gates 20 and 21, respectively, the gate 20 leading to the receiving gate 6 device of FIGURE 2 and the gate 21 to the address receiver.

The address receiver includes a trigger 22 which releases or cuts off a blocking oscillator 23 dependent upon whether the correct address is received or not. If the correct address is not received the blocking oscillator 23 is released and interrupts a gate generator 24 synchronized by an oscillator 25 and supplying gate pulses having a recurrence frequency of 30 kc./s. with a period of interruption of, say, 0.1 second. Due to the periodic interruption of the gate pulses, the AFC device of FIGURE 2 cannot be synchronized through a gate 20.

In the address receiver shown, the incoming address received through the gate 21 is compared with a local address in a comparison device 26, said local address being produced by a local address generator 27. This local address comprises a characteristic series of present and absent pulses at moments when the receiver is opened by a frequency divider 28 having a division factor of 16.

For each transmission of the address proper a series of, for example, 5 sequential pulses are transmitted and control, after integration in an integrator 29, an adjusting device 30 for the local address generator 27 in order to restore it to its initial position. If the incoming address does not correspond to the relevant local address a number of pulses appear at the output of the comparison device 26 and maintain after being integrated in an integrator 31, the trigger 22 in its initial state. If, however, the incoming address corresponds to the local address, no pulses appear at the output of the comparison device 26 so that the voltage at the output of the integrator becomes zero, causing the trigger 22 to be changed over, so that the supply for the blocking oscillator 23 is interrupted. The synchronization is then locked.

It is to be noted that the trigger 22 is of the non-reversible type, that is to say that, when it is changed over and hence the supply for the oscillator 23 is interrupted, it can be restored to its initial state only by interruption of its own supply. When the communication is terminated the replacement of the receiver is utilized, for example, to change over the trigger 22 to its initial state by a short interruption of the supply.

Furthermore, any difference of the incoming address from the local address, even by a single pulse, must be ascertained. The integrator 31 must therefore be so proportioned as to have a rapid charge and a slow discharge.

In such a transmission system the receiver must be prevented from being synchronized on a communication other than that which it was intended to receive.

To this end, it is desirable to maintain the synchronization for a few hundredths of a second, for example, if the synchronization information disappears or is wrong. This may be achieved by means of the following two steps:

(1) Increase in the time constant of the circuit between the phase discriminator and the frequency corrector.

(2) Separate supply of the modulation frequency of the incoming pulses to the frequency corrector through a selective circuit.

Figure 4:
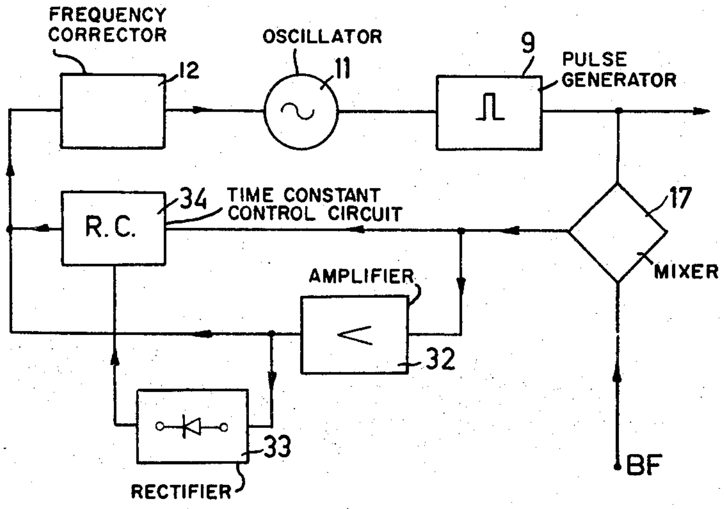
FIGURE 4 shows a variant of the AFC device of FIGURE 2 which provides improved stabilization.

FIGURE 4 shows such a device. The voltage which is supplied by the mixing stage 17 and proportional to the variation frequency of the incoming pulses is also applied to the frequency corrector 12 through a selective amplifier 32 tuned to this variation frequency. At the same time the output voltage of the amplifier 32, after rectification in a rectifier 33, controls a circuit 34 which increases the time constant of the synchronizing circuit.

It can be said that the selective amplifier 32 in this case fulfils the function of an alternating-voltage store and the time constant of the circuit 34 that of a direct-voltage store.

In a second embodiment of a device according to the invention, if a calling station $P_i$ wishes to communicate with a station $P_j$, it transmits only the address $p_j$ of the station being called (and not the addresses $p_i$ and $p_j$ as hereinbefore). If the called station $P_j$ is synchronized it will in turn transmit the same address $p_j$ after the receiver has been removed. In this arrangement a separate address channel is economized and at the same time a considerable simplification in equipment obtained. In this second embodiment the mean pulse-recurrence frequency, the variation frequency of the pulses, the maximum amplitude of the oscillation of variation frequency are used individually or in combination for forming the address. Certain discrete values of these magnitudes for the transmission of the address may be used separately or in combination.

Important advantages are obtained in this way, especially simplification in the equipment for the formation of the address, automatic restoration of the communication upon interruption and a reduced possibility of intermodulation.

Figure 5:
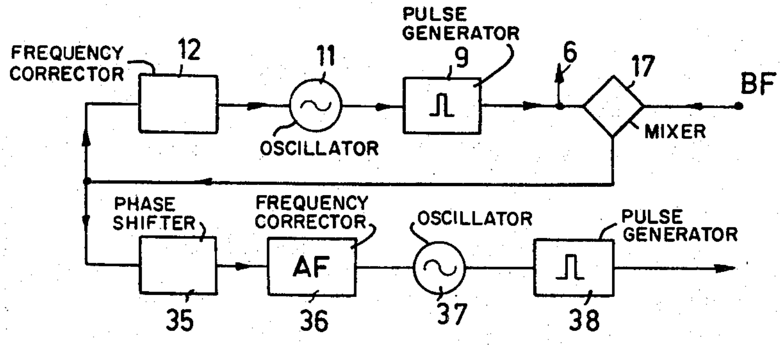
FIGURE 5 shows, according to a second embodiment, synchronizing means for duplex traffic.

In this arrangement (see FIGURE 5) the gate generator 9 in the receiver and a transmitting generator 38 at the transmitting end in the same station are preferably designed as separate units and the variation frequency applied to the frequency corrector 12 of the oscillator 11 of the receiver is also applied through a phase-shifting device 35 to a frequency corrector 36 coupled to an oscillator 37 which synchronizes the transmitting generator 38. The output of the generator 38 is coupled to the delta modulator of the transmitter.

Figure 6:
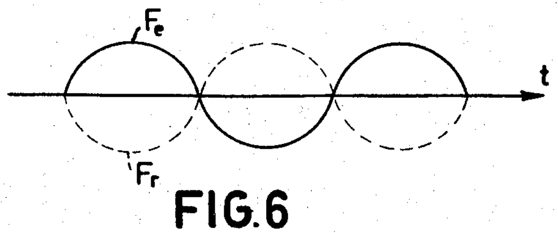
FIGURE 6 shows a time diagram which serves to explain the operation of the arrangement of FIGURE 5.

If the phase-shifting device 35 brings about a phase displacement the instantaneous frequency of the transmitted pulses ($F_e$) and that of the incoming pulses ($F_r$) vary, for example, periodically in opposite senses, as illustrated in the curves of FIGURE 6.

The possibility of coincidence of the pulses for a long period is thus avoided and especially the coincidence is limited to short periodic moments when the frequencies $F_e$ and $F_r$ are equal and therefore not interfering.

The delta-modulation transmitter may be designed in the usual manner and needs therefore no further explanation.

Figure 7:
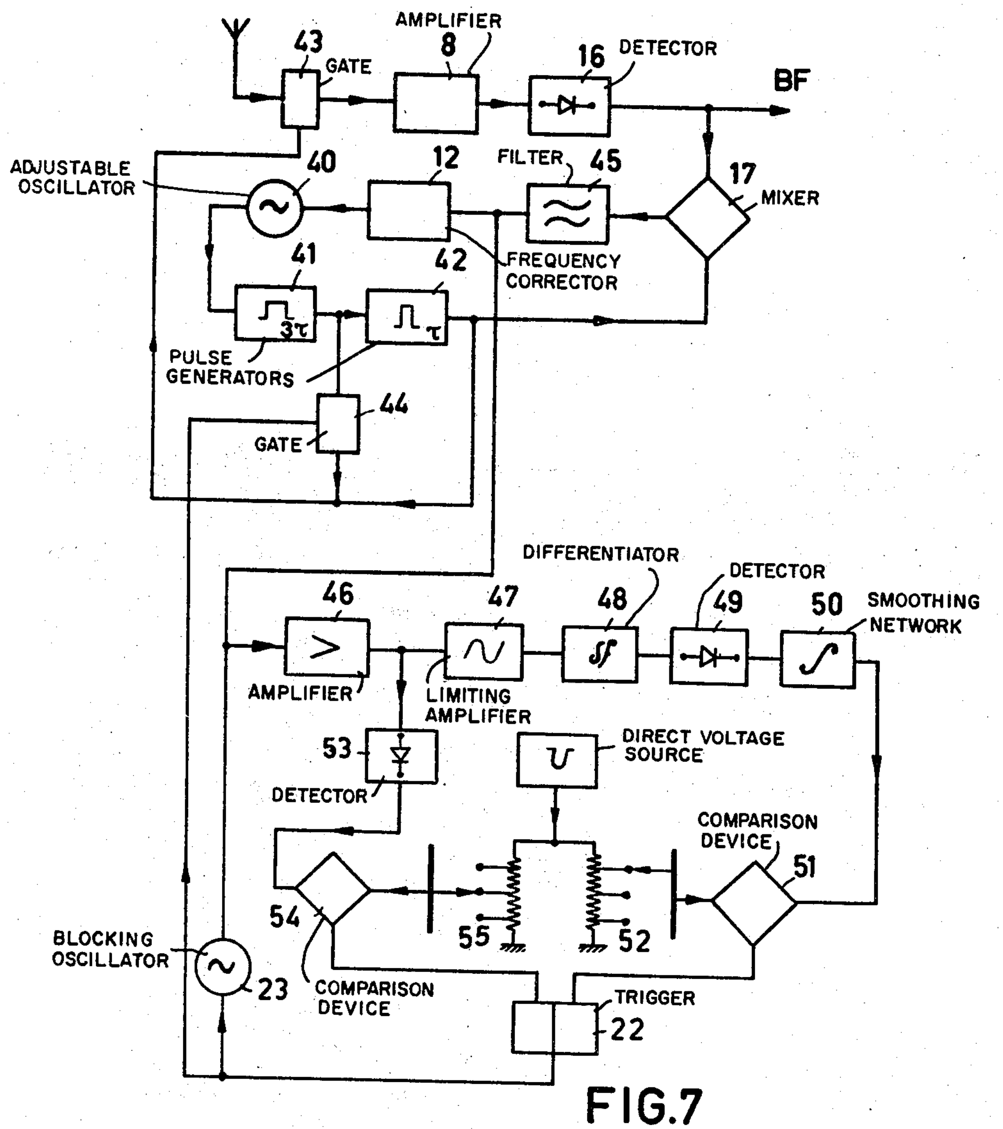
FIGURE 7 shows the complete construction of a receiver according to the second embodiment.

FIGURE 7 shows a receiving device of a radio-transmission system according to the invention.

The receiving device shown in FIGURE 7 includes an oscillator 40 adjustable in steps the number of which corresponds to the various values of the mean pulse-recurrence frequency in the radio-transmission system. The oscillator 40 is followed by a pulse generator 41, which supplies pulses having a pulse width a $3\tau$, and then by a pulse generator 42 which generates pulses having a pulse width $\tau$ The pulses of width $\tau$ are applied directly to a receiving gate 43, whereas the pulses of width $3\tau$ are applied thereto through a gate 44. The gate 43 controls the passage of the pulses to the receiver 8 and the associated amplitude detector 16 which is connected to a terminal BF of the receiver and to the mixing stage 17.

If the AFC device is not yet synchronized and the gate 44 is released by the trigger 22, the reception is effected by releasing the gate 43 during sequential periods each time for a duration of $3\tau$, so that synchronization is readily brought about.

The variation frequency which appears, after selection in a filter 45, at the terminals of the frequency corrector 12 is applied, after amplification in anamplifier 46, limitation in an amplifier 47, differentiation in a differentiating network 48 and detection in an amplitude detector 49, to a smoothing device 50. A direct voltage proportional to the variation frequency is thus set up at the output of the smoothing device 50, said direct voltage being compared in a comparison device 51 with a reference voltage derived from a source U through the intermediary of an adjustable attenuator 52.

The voltage at the output of the amplifier 46 is also rectified in a detector 53 and compared in a comparison device 54 with a reference direct voltage derived from the source U through the intermediary of an adjustable attenuator 55. If both output voltages from the comparison devices 51 and 54 are zero, which means that both the frequency and the amplitude of the oscillation of variation frequency correspond to the desired address, the trigger 22 is changed over with the result that:

The gate 43 is released by pulse generator 42 during the sequential periods of the duration $\tau$, and Also the supply for the blocking oscillator 23 is interrupted, which blocking oscillator, as explained with reference to the first embodiment, has the task to cut off the oscillator 40 at regular intervals if the desired address is not received.

If the incoming address happens to fall out the trigger 22 is changed over and the desired address is searched for again, whereafter automatic restoration of the interrupted communication in two directions rapidly takes place.

Figure 8:
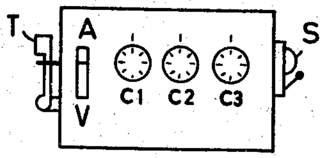
FIGURE 8 shows the outer construction of a station in a radio-transmission system according to the invention.

FIGURE 8 shows the external construction of one station in a transmission system according to the invention. The front side of the device includes a commutator A–V having three knobs $C_1$, $C_2$, $C_3$ which can each occupy 10 different positions. The knob $C_1$ adjusts the various values of the mean pulse-recurrence frequency of the pulses (oscillator 40 upon reception), the knob $C_2$ the variation frequency and the knob $C_3$ the magnitude of the amplitude of the oscillation of variation frequency, so that the positions of the knobs $C_1$, $C_2$, $C_3$ determine the address to be transmitted. The station also includes a telephone receiver T and a ringer having a bell S.

The stations operate as follows:

When the station $P_i$ is switched on to call the corresponding station $P_j$ its switch is set to the calling position A and by means of the knobs $C_1$, $C_2$ and $C_3$, the address $p_j$ of a station $P_j$ to be called is formed in the station $P_i$ and transmitted by the station $P_i$.

The station $P_j$ of simular construction has its switch at the position V at which the receiver of the station $P_j$ permanently generates its own local address $p_j$ which is compared with the incoming address and, if the two addresses are identical, its bell S is ringing. The user thus warned then takes off the receiver so that the transmitter of the station $P_j$ begins to transmit its address $p_j$ and the receiver of the station $P_j$ is synchronized on the transmitter of the station $P_i$. The receiver of the station $P_i$ compares the address $p_j$ of the pulses received by it with the internal address $p_j$ generated by it. The communication between the two stations in two directions is thus established and locked.

What is claimed is:

1. In a radio transmission system of the type having a transmitter for transmitting information in the form of modulated pulses having a pulse recurrence frequency characteristic of a given receiver, and said given receiver comprises means for receiving only pulsatory signals having said characteristic pulse recurrence frequency; the improvement wherein said transmitter comprises means for periodically varying the position of said pulses at a variation frequency, and said receiver comprises receiving gate means, means for periodically releasing said gate means at said characteristic frequency for passing incoming signals, and automatic frequency control means responsive to said periodic variation of the position of said pulses for periodically varying the release times of said gate means at said variation frequency, whereby said gate means is released in synchronism with the reception of said modulated pulses.

2. In a radio transmission system of the type having a transmitter for transmitting information in the form of modulated pulses and wherein said transmitter during a call to a given receiver continually transmits address information characteristic of said given receiver, and said given receiver comprises means responsive to the reception of said characteristic address information for rendering said receiver selectively responsive only to signals from said transmitter, the improvement wherein said transmitter comprises means for periodically varying the position of said modulated pulses at a variation frequency, and said receiver comprises receiving gate means, automatic frequency control means responsive to the reception of said modulated pulses for controlling said gate means, whereby said gate means is released to pass received signals in synchronism with said modulated pulses, and means responsive to the absence of reception of said characteristic address information connected to interrupt the operation of said automatic frequency control means, whereby said gate means is released in synchronism with said modulated pulses only upon reception of said characteristic address information.

3. A receiver for receiving signals in the form of modulated pulses having a pulse recurrence frequency that is periodically varied at a variation frequency, and said signals include address information characteristic of said receiver, said receiver comprising receiving gate means, automatic frequency control means responsive to the reception of said modulated pulses for controlling said gate means, whereby said gate means is released to pass received signals in synchronism with said modulated pulses, and address receiver means responsive to the absence of reception of said characteristic address information connected to interrupt the operation of said automatic frequency control means, whereby said gate means is released in synchronism with said modulated pulses only upon reception of said characteristic address information.

4. The receiver of claim 3 in which said automatic frequency control means comprises pulse generating means for producing control pulses for releasing said gate means, and means responsive to a time difference between said control pulses and said modulated pulses after they have passed through said gate means for controlling the frequency of said pulse generating means to reduce said difference.

5. The receiver of claim 4 comprising means responsive to substantial synchronism between said control pulses and said modulated pulses for reducing the durations of release of said gate means.

6. The receiver of claim 4 wherein said address receiver means comprises means for increasing the durations of release of said gate means when said characteristic address information is not received.

7. The receiver of claim 3 wherein said characteristic address information is in the form of a series of characteristic pulses having a frequency that is a fraction of the pulse repetition frequency of said modulated pulses, comprising separate receiving means for said characteristic pulses, a source of address pulses, means for comparing said characteristic pulses and said address pulses, and mean responive to a difference between said address pulses and said characteristic pulses for interrupting the operation of said automatic frequency control means.

8. The receiver of claim 3 wherein said characteristic address information is at least partly in the form of a predetermined variation frequency and amplitude of said variation frequency, and said address receiver means comprises means for producing first and second direct voltages proportional to the frequency and amplitude respectively of the received variation frequency oscillation, a source of third and fourth reference direct voltages, and means responsive to differences between said first and third voltages and said second and fourth voltages for interrupting the operation of said automatic frequency control means.

References Cited

UNITED STATES PATENTS

| | | | |
|---|---|---|---|
| 2,662,113 | 12/1953 | Schouten et al. | |
| 2,740,106 | 3/1956 | Phelps | 325—55 |
| 2,812,509 | 11/1957 | Phelps | 325—55 |
| 2,861,179 | 11/1958 | Jacob et al. | 325—64 |
| 3,104,392 | 9/1963 | Towler | 325—55 |

ROBERT L. GRIFFIN, *Primary Examiner.*

JOHN W. CALDWELL, *Examiner.*

W. S. FROMMER, *Assistant Examiner.*